United States Patent
Merlo et al.

(10) Patent No.: US 10,227,923 B2
(45) Date of Patent: Mar. 12, 2019

(54) SYSTEM FOR PREVENTING ICING ON AN AIRCRAFT SURFACE USING A PLASMA ACTUATOR

(71) Applicant: ALENIA AERMACCHI S.P.A., Venegono Superiore (IT)

(72) Inventors: Emanuele Merlo, Arona (IT); Alessandro Gurioli, Venegono Superiore (IT); Ermanno Magnoli, Venegono Superiore (IT); Giordano Mattiuzzo, Venegono Superiore (IT); Roberto Pertile, Venegono Superiore (IT)

(73) Assignee: ALENIA AERMACCHI S.P.A., Venegono Superiore (IT)

(*) Notice: Subject to any disclaimer, the term of this patent is extended or adjusted under 35 U.S.C. 154(b) by 513 days.

(21) Appl. No.: 14/765,744

(22) PCT Filed: Feb. 3, 2014

(86) PCT No.: PCT/IB2014/058751
§ 371 (c)(1),
(2) Date: Aug. 4, 2015

(87) PCT Pub. No.: WO2014/122568
PCT Pub. Date: Aug. 14, 2014

(65) Prior Publication Data
US 2016/0003147 A1  Jan. 7, 2016

(30) Foreign Application Priority Data

Feb. 6, 2013  (IT) .............. TO2013A0095

(51) Int. Cl.
*F02C 7/047* (2006.01)
*B64D 15/00* (2006.01)
(Continued)

(52) U.S. Cl.
CPC .............. *F02C 7/047* (2013.01); *B64D 15/00* (2013.01); *B64D 15/12* (2013.01); *B64D 15/14* (2013.01);
(Continued)

(58) Field of Classification Search
CPC ........ B64D 15/00; B64D 15/12; B64D 15/14; B64D 2033/0233; B64D 2033/0286;
(Continued)

(56) References Cited

U.S. PATENT DOCUMENTS 3,095,163 A * 6/1963 Hill ....................... B64C 23/005
244/12.1
6,570,333 B1  5/2003 Miller et al.
(Continued)

FOREIGN PATENT DOCUMENTS

WO  WO 2012036602 A1 * 3/2012 ........... B64C 23/005

OTHER PUBLICATIONS

Rigit, Andrew, et al., "Electrical Performance Evaluations for a Dielectric Barrier Discharge Plasma Actuator", 2009, IEEE, 2009 Annual Report Conference on Electrical Insulation and Dielectric Phenomena, pp. 67-71.*
(Continued)

*Primary Examiner* — Scott Walthour
(74) *Attorney, Agent, or Firm* — Merchant & Gould P.C.

(57) ABSTRACT

A system for preventing icing on an aircraft surface includes a plasma actuator which is applied onto an aircraft surface operationally exposed to air and which is arranged for generating at least one plasma discharge (D) for inducing a flow (F) of ionized hot-air particles towards the surface.

5 Claims, 2 Drawing Sheets

(51) Int. Cl.
  *F01D 25/02* (2006.01)
  *B64D 15/14* (2006.01)
  *B64D 15/22* (2006.01)
  *B64D 15/20* (2006.01)
  *B64D 15/12* (2006.01)
  *F15D 1/00* (2006.01)
  *H05H 1/24* (2006.01)
  *B64D 33/02* (2006.01)

(52) U.S. Cl.
  CPC ............ *B64D 15/20* (2013.01); *B64D 15/22* (2013.01); *F01D 25/02* (2013.01); *B64D 2033/0233* (2013.01); *B64D 2033/0286* (2013.01); *F05D 2270/172* (2013.01); *F15D 1/0075* (2013.01); *H05H 1/2406* (2013.01); *H05H 2001/2412* (2013.01); *H05H 2001/2418* (2013.01); *H05H 2001/2425* (2013.01); *H05H 2001/2437* (2013.01)

(58) Field of Classification Search
  CPC .... F01D 25/02; F02C 7/047; F05D 2270/172; F15D 1/0075; H05H 1/2406; H05H 2001/2412; H05H 2001/2418; H05H 2001/2425; H05H 2001/2437
  See application file for complete search history.

(56) References Cited

U.S. PATENT DOCUMENTS

| | | | |
|---|---|---|---|
| 2004/0149734 A1 | 8/2004 | Petrenko et al. | |
| 2008/0023589 A1 | 1/2008 | Miles et al. | |
| 2011/0049300 A1* | 3/2011 | Safai | B64D 15/12 244/134 D |
| 2011/0162340 A1* | 7/2011 | Valleroy | B64D 33/02 60/39.093 |
| 2011/0303302 A1* | 12/2011 | Porte | B64C 7/02 137/15.1 |

OTHER PUBLICATIONS

International Search Report dated May 8, 2014 for corresponding International Application No. PCT/IB2014/058751, filed Feb. 3, 2014.

International Preliminary Report on Patentability dated May 5, 2015 for corresponding International Application No. PCT/IB2014/058751, filed Feb. 3, 2014.

* cited by examiner

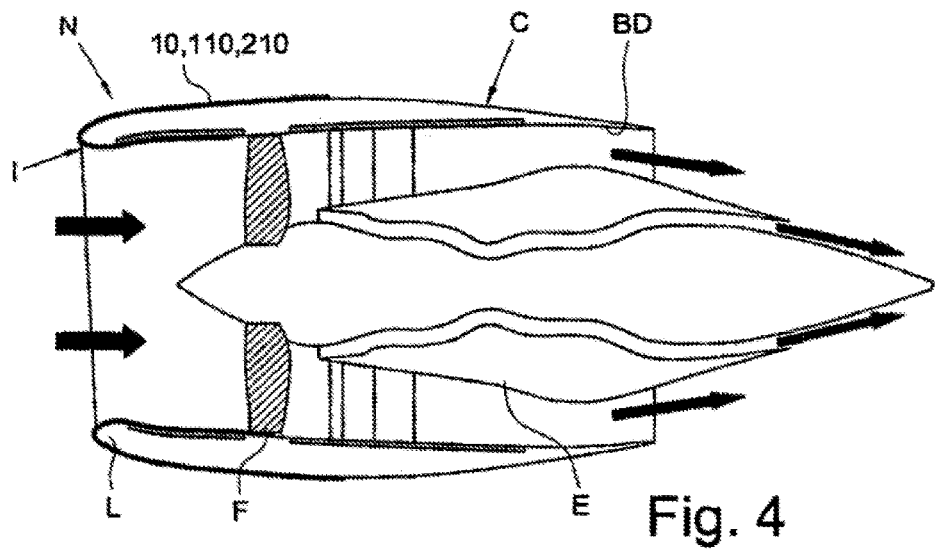
Fig. 4
Fig. 5
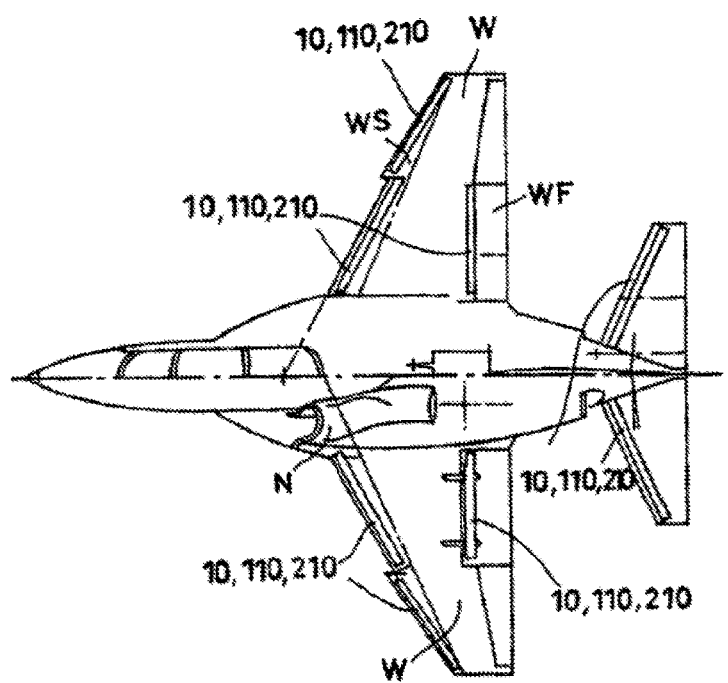

SYSTEM FOR PREVENTING ICING ON AN AIRCRAFT SURFACE USING A PLASMA ACTUATOR

CROSS-REFERENCE TO RELATED APPLICATIONS

This application is a National Stage Application of PCT/IB2014/058751, filed 3 Feb. 2014, which claims benefit of Serial No. TO2013A000095, filed 6 Feb. 2013 in Italy and which applications are incorporated herein by reference. To the extent appropriate, a claim of priority is made to each of the above disclosed applications.

DESCRIPTION

Technical Field

The present invention relates to a system for preventing icing on an aircraft surface operationally exposed to air.

Background Art

Ice formation and deposition on exposed surfaces, in particular aerodynamic surfaces, of an aircraft is a problem of primary importance as regards the full operability, the safety and the efficiency of an aircraft during the use or operation thereof, whether the same is intended for civil or military applications.

In order to prevent this phenomenon from arising, pneumatic, electric or mechanical systems are used which utilize power to heat the surfaces affected by the problem, so as to avoid that the humidity or water lapping said exposed surface might enter the solid state, or to mechanically remove ice after it has formed.

In the art are known some devices or methods as described in their respective documents.

For example, US 2008/023589 A1 discloses systems and methods for controlling flow with electrical pulses. An aircraft system in accordance with one embodiment includes an aerodynamic body having a flow surface exposed to an adjacent air stream, and a flow control assembly that includes a first electrode positioned at least proximate to the flow surface and a second electrode positioned proximate to and spaced apart from the first electrode. A dielectric material can be positioned between the first and second electrodes, and a controller can be coupled to at least one of the electrodes, with the controller programmed with instructions to direct air-ionizing pulses to the electrode, and provide a generally steady-state signal to the electrode during intervals between the pulses.

US 2004/149734 A1 discloses an alternating electric field applied to ice to generate a resistive AC having a frequency greater than 1000 Hz in interfacial ice at an interface. A first electrode and a second electrode proximate to the interface are separated by an electrical insulator. An AC power source provides a voltage of about 10 to 500 volts across the electrodes to create the alternating electric field. A portion of the capacitive AC associated with the alternating electric field is present in the interfacial ice as conductivity (resistive) AC, which causes dielectric loss heating in the interfacial ice.

U.S. Pat. No. 6,570,333 discloses a method for generating a discharge plasma which covers a surface of a body in a gas at pressures from 0.01 Torr to atmospheric pressure, by applying a radio frequency power with frequencies between approximately 1 MHz and 10 GHz across a plurality of paired insulated conductors on the surface. At these frequencies, an arc-less, non-filamentary plasma can be generated to affect the drag characteristics of vehicles moving through the gas. The plasma can also be used as a source in plasma reactors for chemical reaction operations.

SUMMARY OF THE INVENTION

It is one object of the present invention to provide a system for preventing icing on an aircraft surface operationally exposed to air, said system being improved over those in accordance with the prior art.

It is to be understood that the appended claims are an integral part of the technical teachings provided in the following detailed description of the invention.

BRIEF DESCRIPTION OF THE DRAWINGS

Further features and advantages of the present invention will become apparent from the following detailed description, which is supplied by way of non-limiting example with reference to the annexed drawings, wherein:

FIG. 4 is a longitudinal sectional view of an engine nacelle having a surface exposed to air, equipped with one of the systems shown in FIGS. 1 to 3; and FIG. 5 is a top view of an aircraft equipped with a plurality of surfaces exposed to air and fitted with one of the systems shown in the preceding Figures.

DETAILED DESCRIPTION OF THE INVENTION

Figure 1:
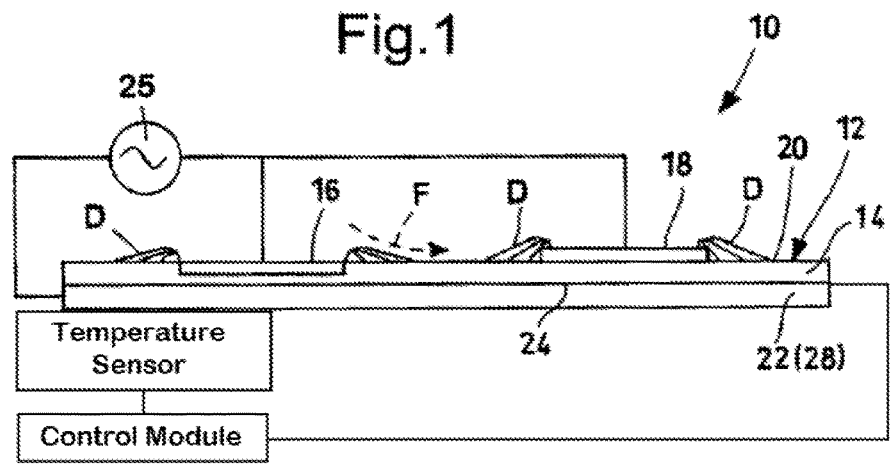
FIGS. 1 to 3 are schematic sectional views of three exemplary embodiments of a system for preventing icing on an aircraft surface operationally exposed to air, in accordance with the present invention.
Figure 2:
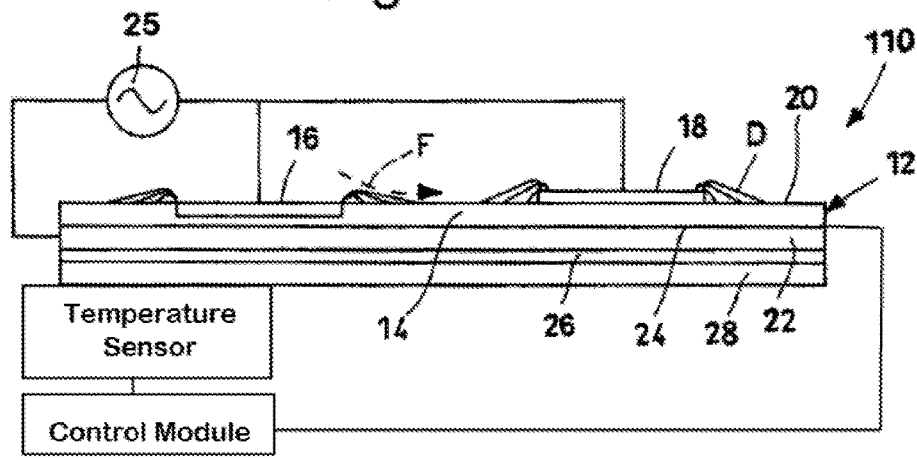
Figure 3:
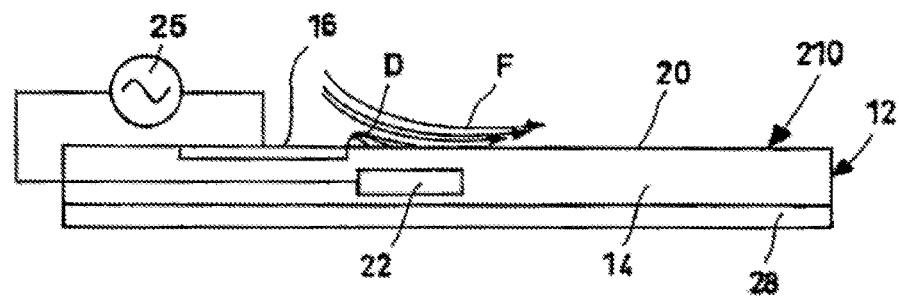

With particular reference to FIGS. 1 to 3, there are shown different exemplary embodiments of a system for preventing icing on an aircraft surface operationally exposed to air, in accordance with the present invention;

With particular reference to FIG. 1, numeral 10 designates as a whole an exemplary embodiment of a system according to the present invention.

System 10 comprises a plasma actuator, designated as a whole by reference numeral 12, intended for application onto a surface exposed to air of an aircraft (said surface being schematically identified by reference numeral 28) and arranged for generating at least one plasma discharge D for inducing a flow (schematically represented by dashed arrow F in FIG. 1) of ionized hot-air particles towards said exposed surface.

More in detail, the plasma discharge generated by using actuator 12 triggers ionization in the particles contained in the gas present in the surrounding air. In order to cause this ionization, heat is generated in the air which is then yielded to the gas particles.

Furthermore, the intense electric field generated by the plasma can interact with the latter's ionized particles, thereby producing mass forces that create said (oriented) flow of ionized air particles, accelerating them in a direction that converges towards the exposed surface.

Therefore, the heat generated by ionization is directed towards said exposed surface 28 on which system 10 has been positioned, thus preventing icing from occurring on such surfaces.

Of course, by changing the geometries and operating parameters of plasma actuator 12, it is possible to obtain different force fields and associated mass flows, so as to ensure that the particle flow is controlled within the boundary layer on surface 28 exposed to air which is affected by plasma generation.

In this embodiment, said plasma actuator 12 is of the dielectric barrier discharge (DBD) type, which generates so-called cold plasma. As is known in the art, the term "cold plasma" comes from the fact that the temperature of the ionized particles thus generated is typically in the range of 40° C. to 100° C., so that the presence of plasma has no destructive effects upon the surrounding material (also including, in particular, the dielectric barrier incorporated in actuator 12).

Preferably, actuator 12 comprises:
an intermediate portion 14 of dielectric material,
at least one exposed electrode portion 16, 18 positioned on an outer side 20 of the intermediate portion 14, at least a part thereof being exposed to air, and
a covered electrode portion 22 not operationally exposed to air because of intermediate portion 14; in this embodiment, covered electrode portion 22 corresponds to the outer covering of the aircraft, which will necessarily be made of metal
wherein electrode portions 16, 18, 22 are electrically connectable to a high-voltage electric power generator 25 and are adapted to be energized by said electric power to generate said plasma discharge D between them.

Therefore, when generator 25 is activated, plasma discharges D are generated in the proximity of (at least one) exposed electrode portion 16, 18, but not on covered electrode portion 22, since the latter is insulated from the air by intermediate portion 14.

In this embodiment, actuator 12 comprises at least one pair of exposed electrode portions 16, 18.

Advantageously but not necessarily, at least one exposed electrode portion 18 is positioned on top of intermediate portion 14. In other words, said exposed electrode portion 18 is prominent, e.g. it protrudes like a relief or an "embossment", relative to the intermediate portion 14. In particular, the top surface and the side surface of the exposed electrode portion 18 are operationally exposed to air, whereas the bottom surface of the exposed electrode portion 18 remains in contact with intermediate portion 14, and is thus electrically insulated from the air.

Advantageously but not necessarily, at least one exposed electrode portion 16 is partially embedded in intermediate portion 14. In the illustrated embodiment, the exposed electrode portion 16 is flush with outer side 20 of intermediate portion 14. Particularly, the top surface of the exposed electrode portion 16 is exposed to air, whereas its side surface and its bottom surface are electrically insulated from the air, in that said bottom surface is in contact with intermediate portion 14.

In particular, covered electrode portion 22 is at least partially positioned under an inner surface or inner side 24, opposite to the outer surface or outer side 20, of the portion of dielectric material 14. In this embodiment, covered electrode portion 22 is completely arranged under inner side 24.

Optionally, covered electrode portion 22 is at least partly constituted by exposed surface 28 of the aircraft, which is generally electrically conductive, in particular being made of metallic material. In the embodiment shown in FIG. 1, exposed surface 28 that at least partly constitutes covered electrode portion 22 may be a portion of the covering of the aircraft.

In this illustrated embodiment, generator 25 is configured for generating an alternating-current electric voltage, e.g. having a frequency of the order of magnitude of kHz and/or an amplitude of the order of magnitude of kV. Particularly, generator 25 can originate a voltage which is modulated as concerns at least one of frequency and amplitude, for the purpose of optimally adapting the operation of system 10 to the desired specifications in terms of performance and energy consumption. For example, said voltage may be amplitude-modulated according to an ON/OFF pulsing, and possibly frequency-modulated as concerns at least one of:
relative duration between the ON pulse and the OFF pulse, and
total duration of one complete pulsing period (i.e. the sum of the duration of the ON pulse and the duration of the OFF pulse).

In the illustrated embodiment, the system may comprise a control module which can automatically control generator 25 according to predetermined criteria, allowing for automatic intervention only when particular operating conditions occur (e.g. if the temperature of said surface 28 operationally exposed to air is lower than a predetermined threshold value). For example, system 10 may also include at least one sensor, e.g. a temperature sensor, for providing the control module with a signal indicating the occurrence of the above-mentioned operating conditions, e.g. that the temperature of surface 28 operationally exposed to air has gone below said threshold value. In such a case, the control module can then control generator 25 on the basis of said indicative signal, according to predetermined criteria (e.g. by activating the generator or by appropriately adjusting the voltage it generates, in particular through amplitude and/or frequency modulation, as a function of temperature or other parameters detected by the sensor).

With particular reference to FIG. 2, there is shown a further exemplary embodiment of a system 110 designed in accordance with the present invention.

Those parts or elements which are similar to—or which perform the same function as—those of the above-described embodiment have been assigned the same reference numerals. For simplicity, the description of such parts or elements will not be repeated below, and reference will be made to the above description of the previous embodiment.

One of the differences that can be noticed in comparison with the previously described embodiment is that system 110 comprises an insulating portion 26 of dielectric material, positioned under covered electrode portion 22, to be applied onto the surface operationally exposed to air of the aircraft. In FIG. 2 said surface is designated by reference numeral 28. In other systems, covered electrode portion 22 is interposed, in particular in a "sandwich" fashion, between intermediate portion 14, which is located in the outermost position, and insulating portion 26, which is located in the innermost position.

Therefore, in the embodiment previously shown in FIG. 1, covered electrode portion 22 coincides with surface 28 operationally exposed to air of the aircraft, with no electric insulation between them. Instead, in the embodiment shown in FIG. 2 there is a separation between covered electrode portion 22 and said surface 28, in that they are two distinct elements which are electrically insulated from each other by insulating portion 26.

With particular reference to FIG. 3, there is shown a further exemplary embodiment of a system 210 designed in accordance with the present invention.

Those parts or elements which are similar to—or which perform the same function as—those of the above-described embodiments have been assigned the same alphanumeric references. For simplicity, the description of such parts or elements will not be repeated below, and reference will be made to the above description of the previous embodiments.

One of the differences that can be noticed in comparison with the previously described embodiments is that covered electrode portion 22 is embedded in intermediate portion 14.

By way of example, system 210 may be manufactured by rolling.

In the embodiments shown in FIGS. 1 to 3, system 10, 110, 210 can be structured as a rolled section processed into a continuous strip in which intermediate portion 14 is obtained, which includes a layer of dielectric material onto which the following elements are applied:
- on one side, the exposed electrode portion(s) 16, 18, and
- on the other side, covered electrode portion 22, particularly in the form of a layer of electrically conductive material.

Said rolled section can then be easily applied onto the desired exposed surfaces of the aircraft.

As an alternative, system 10 may also be fabricated as a "multilayer" element, which can also be obtained by means of different stratification processes, wherein said intermediate portion 14 is initially deposited (with electrode portion 22) onto the exposed surface of the aircraft by using deposition techniques which are per se known to a man skilled in the art.

Advantageously but not necessarily, said at least one exposed electrode portion 16, 18 may be made as a longitudinal band of electrically conductive material, which is subsequently applied onto intermediate portion 14. For example, said band may either be applied over said intermediate portion 14 (which preferably includes a layer of dielectric material) or be partially embedded in the latter. In particular, a plurality of exposed electrode portions 16, 18 may be conceived in the form of bands of electrically conductive material, which may be arranged, by way of example, in longitudinal rows, preferably parallel to one another, on/in intermediate portion 14.

Said at least one exposed electrode portion 16, 18 can be connected to said intermediate portion 14 by glueing or by using other deposition techniques which are per se known to a man skilled in the art.

With particular reference to FIG. 4, there is shown an engine nacelle N on which one or more of systems 10, 110, 210 are mounted, each one of them being designed in accordance with one of the previously described embodiments.

In a per se known manner, engine nacelle N comprises a "cowling" C having an aerodynamic shape. In particular, cowling C has a substantially tubular shape, e.g. a barrel-like shape, with an annular profile preferably having a prevalently airfoil longitudinal section.

More in detail, cowling C has an air "inlet" I from which a through cavity develops, which extends in a substantially axial direction.

The structure of cowling C includes a radially external side wall and a radially internal side wall, which are referred to in the art as "outer barrel" and "inner barrel", respectively.

In particular, devices for acoustic attenuation, also referred to in the art as soundproof panels, are mounted on the radially internal side wall of the cowling for reducing the noise which is typically generated during the operation of the aircraft on which said engine nacelle N is mounted.

In cowling C, within the through cavity and downstream of inlet I, a jet-type propulsion assembly is accommodated, which is adapted to receive air from the air inlet and accelerate it in order to generate a thrust. In particular, the propulsion assembly is designed as a turbo-fan structure, i.e. it comprises:
- a fan F for accelerating the air flow coming in through inlet I, and
- an engine E positioned downstream of fan F.

In the illustrated embodiment, it can be seen that between cowling C and engine E there is an annular region or by-pass duct BD, which is structured for conveying that air fraction which flows through fan F without however entering engine E.

Of course, the structure and operation of said propulsion assembly, as diagrammatically shown in FIG. 1, are per se known in the industry, and for simplicity they will not be described in detail below. In said drawing, the air flows that go through the engine nacelle are shown, by way of example, by means of a series of arrows.

In this embodiment, engine nacelle N includes system 10, 110, 210, which is positioned at air inlet I, in particular covering lip L and preferably extending over exposed surfaces of at least one radially external side wall ("outer barrel") and one radially internal side wall ("inner barrel") adjacent to lip L.

With particular reference to FIG. 5, there is shown an aircraft, e.g. a fixed-wing aircraft, on which one or more of systems 10, 110, 210 are mounted, each one of them being designed in accordance with one of the previously described embodiments.

In particular, the aircraft comprises a pair of fixed wings W, wherein at least one of them has at least one surface operationally exposed to air, onto which at least one of systems 10, 110, 210 has been applied. Preferably but not necessarily, system 10, 110, 210 is positioned in the proximity of the leading edge of wing W.

Advantageously but not necessarily, system 10, 110, 210 can be positioned on the exposed surface of the flaps of wing W, in particular of at least one of front flap WS (commonly referred to in the industry as "nose droop or slat") and the rear flap WF (commonly referred to in the industry as "flap"). In the embodiment shown in FIG. 5, both front flap WS and the rear flap are equipped with a system 10, 110, 210 designed in compliance with the present invention.

In the embodiment shown in FIG. 5, at least one system 10, 110, 210 is arranged at the tail of the aircraft, i.e. on the horizontal empennages and on the vertical empennage, particularly on the leading edges of the tail itself.

The technical characteristics that differentiate the various embodiments and variants thereof described and illustrated herein are freely interchangeable, whenever compatible.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. An engine nacelle including a system for preventing icing on an aircraft surface operationally exposed to air; said system being positioned at a covering lip of an air inlet; said system for preventing icing extending over the aircraft surface operationally exposed to air, the aircraft surface operationally exposed to air being (1) at least a portion of at least one radially internal side wall of the engine nacelle adjacent to the covering lip and (2) at least a portion of at least one radially external side wall of the engine nacelle adjacent to the covering lip;

said system comprising:
- a dielectric barrier discharge plasma actuator arranged on said aircraft surface operationally exposed to air, and arranged to generate at least one plasma discharge for inducing a flow of ionized hot-air particles towards said aircraft surface operationally exposed to air;
- said dielectric barrier discharge plasma actuator comprising:
  - an intermediate portion of dielectric material;
  - at least one exposed electrode portion positioned on an outer side of said intermediate portion, the at least one exposed electrode portion being exposed to air; and
  - at least one covered electrode portion of said intermediate portion, the at least one covered electrode portion being operationally shielded from air flowing over said outer side;
  - said at least one exposed electrode portion and said at least one covered electrode portion being electrically connected to a high-voltage electric power generator and being adapted to be energized by said high-voltage electric power generator to generate said at least one plasma discharge between the at least one exposed electrode portion and the at least one covered electrode portion;
  - said at least one covered electrode portion being at least partially positioned between an inner side, opposite to said outer side, of said intermediate portion and said aircraft surface operationally exposed to air;
  - an insulating portion of dielectric material positioned between said at least one covered electrode portion, and said aircraft surface operationally exposed to air;
- a control module configured to automatically control said high-voltage electric power generator when particular operating conditions occur, said particular operating conditions corresponding to a temperature of said aircraft surface operationally exposed to air being below a threshold temperature; and
- at least one temperature sensor providing a signal to the control module, the signal indicating that the temperature of said aircraft surface operationally exposed to air is below the threshold temperature;
- wherein said control module performs said automatic control of said high-voltage electric power generator based on the signal from the temperature sensor according to predetermined control criteria.

2. The engine nacelle according to claim 1, wherein said at least one exposed electrode portion is positioned on said intermediate portion and extends from said outer side of said intermediate portion.

3. The engine nacelle according to claim 1, wherein said at least one exposed electrode portion is partially embedded in said intermediate portion.

4. The engine nacelle according to claim 1, wherein said at least one covered electrode portion is embedded in said intermediate portion.

5. An aircraft including at least one engine nacelle according to claim 1.

* * * * *